(12) United States Patent
Harris et al.

(10) Patent No.: US 6,945,329 B2
(45) Date of Patent: Sep. 20, 2005

US006945329B2

(54) METHODS AND COMPOSITIONS FOR PLACING PARTICULATE MATERIALS IN SUBTERRANEAN ZONES

(75) Inventors: Phillip C. Harris, Duncan, OK (US); Ronnie G. Morgan, Waurika, OK (US); Philip D. Nguyen, Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 208 days.

(21) Appl. No.: 10/438,504

(22) Filed: May 15, 2003

(65) Prior Publication Data

US 2004/0226716 A1 Nov. 18, 2004

(51) Int. Cl.[7] .............................................. E21B 43/267
(52) U.S. Cl. ................. 166/308.6; 166/280.2; 166/308.3; 507/202; 507/204; 507/269; 507/922
(58) Field of Search ................................ 166/276, 278, 166/280.2, 308.3, 308.6, 270.1; 507/202, 204, 269, 922

(56) References Cited

U.S. PATENT DOCUMENTS

| | | | | |
|---|---|---|---|---|
| 3,603,398 A | | 9/1971 | Hutchison | .................. 166/305 |
| 4,780,243 A | | 10/1988 | Edgley et al. | .............. 252/307 |
| 5,076,357 A | * | 12/1991 | Marquis | ...................... 166/403 |
| 5,711,376 A | | 1/1998 | Sydansk | ..................... 166/308 |
| 5,990,052 A | | 11/1999 | Harris | ......................... 507/214 |
| 6,123,159 A | * | 9/2000 | Brookey et al. | .............. 175/72 |
| 6,302,209 B1 | * | 10/2001 | Thompson et al. | ...... 166/305.1 |

OTHER PUBLICATIONS

Foreign communication from a related counterpart application dated Sep. 13, 2004.

* cited by examiner

*Primary Examiner*—Zakiya Walker
(74) *Attorney, Agent, or Firm*—Robert A. Kent; Baker Botts, L.L.P.

(57) ABSTRACT

Methods and compositions for placing particulate materials in subterranean zones penetrated by well bores. In one embodiment, the methods comprise: providing a compacted particulate material fluid that comprises a compacted particulate material, and a foam within the pore spaces of the compacted particulate material, the foam comprising a pressurized gas and a liquid solution of a foam forming surfactant; and pumping the compacted particulate material fluid into the subterranean zone.

34 Claims, 3 Drawing Sheets

METHODS AND COMPOSITIONS FOR PLACING PARTICULATE MATERIALS IN SUBTERRANEAN ZONES

BACKGROUND OF THE INVENTION

1. Field of the Invention

The present invention relates to improved methods and compositions for placing particulate materials in subterranean zones including, but not limited to, forming gravel packs in well bores and forming and placing particulate materials in fractures.

2. Description of the Prior Art

In the completion and stimulation of wells penetrating subterranean zones containing hydrocarbons, it is often necessary to place particulate materials in the subterranean zones. An example of a well completion operation involving the placement of particulate material is gravel packing. In gravel packing operations, a solid particulate material such as graded sand is placed in a subterranean hydrocarbon producing zone between the zone and the well bore. The particulate material functions as a filter to separate formation solids from produced fluids while permitting the produced fluids to flow into and through the well bore.

An example of a subterranean zone production stimulation treatment in which particulate material is placed in the subterranean zone is hydraulic fracturing. In hydraulic fracturing, a viscous treating fluid, referred to in the art as a fracturing fluid, is pumped through the well bore into a subterranean zone to be stimulated at a rate and pressure such that one or more fractures are formed and extended in the subterranean zone. The viscous fracturing fluid carries a particulate material, referred to in the art as proppant material, such as graded sand into the fractures. The proppant material is suspended in the viscous fracturing fluid so that the proppant material is deposited in the fractures when the viscous fracturing fluid is broken, i.e., the viscosity of the fracturing fluid is reduced, and the fracturing fluid is recovered. The proppant material functions to prevent the formed fractures from closing whereby conductive channels are formed in which formation fines are filtered out of produced hydrocarbons and through which the produced hydrocarbons flow to the well bore.

In gravel packing and fracturing procedures, the particulate materials utilized are carried to the subterranean zone in which the particulate materials are to be placed by viscous carrier fluids. These carrier fluids can be water or oil based fluids and generally include a variety of chemical additives such as polymers, cross-linkers, clay control additives, pH control additives, fluid loss additives, surfactants, stabilizers, viscosity breakers, friction reducers and the like. It has been well established that the chemical additives in the carrier fluid can and often do cause damage to the hydrocarbon permeability of subterranean zones in which they are introduced. In addition, the various chemical additives included in the carrier fluids can be hazardous to the health of personnel in contact with the additives.

Thus, there are needs for improved methods and compositions for placing particulate materials in subterranean zones which do not utilize carrier fluids or chemical additives and do not damage the permeability of subterranean zones in which the particulate materials are placed.

SUMMARY OF THE INVENTION

The present invention provides improved methods and compositions for placing particulate materials in subterranean zones which meet the needs described above and overcome the deficiencies in the prior art. The methods of placing particulate materials in subterranean zones penetrated by well bores of this invention such as in gravel packing basically comprise the following steps. A pumpable compacted particulate material fluid is prepared or provided comprising compacted particulate material and a foam within the pore spaces of the compacted particulate material. The foam comprises a pressurized gas and a liquid solution of one or more foam forming surfactants. The resulting compacted particulate material fluid is pumped into the subterranean zone.

A method of the present invention for fracturing a subterranean zone penetrated by a well bore and placing particulate material therein comprises the following steps. A pumpable compacted particulate material fracturing fluid is prepared or provided comprising compacted particulate material and a foam within the pore spaces of the compacted particulate material. The foam comprises a pressurized gas and a liquid solution of one or more foam forming surfactants. The compacted particulate material fracturing fluid formed is pumped into the subterranean zone at a rate and pressure sufficient to fracture the zone. Thereafter, the pumping is terminated and the pressure is reduced so that the fractures close on the compacted particulate material fracturing fluid.

A pumpable particulate material composition of this invention basically comprises compacted particulate material and a foam within the pore spaces of the compacted particulate material. The foam comprises a pressurized gas and a liquid solution of one or more foam forming surfactants.

The particular pressure of the pressurized gas within the pore spaces of the compacted particulate material depends on the pressure to be encountered in the subterranean zone where the pumpable particulate material composition of the invention is to be placed. The pumpable particulate material composition does not include a carrier liquid but instead includes a liquid solution of foam forming surfactant and pressurized gas which forms a foam within the pore spaces of the compacted particulate material. As a result, there is minimal or no leak-off of liquid to the formation, less pumping horsepower and pumping time is required, no chemical additives enter the permeability of the subterranean zone, there is no health risk to personnel, and the compacted particulate material placed in the subterranean zone is clean and virtually free of any damage which allows the subterranean zone to produce hydrocarbons at the highest capacity.

The objects, features and advantages of the present invention will be readily apparent to those skilled in the art upon a reading of the description of preferred embodiments which follows when taken in conjunction with the accompanying drawings.

DESCRIPTION OF PREFERRED EMBODIMENTS

Figure 1:
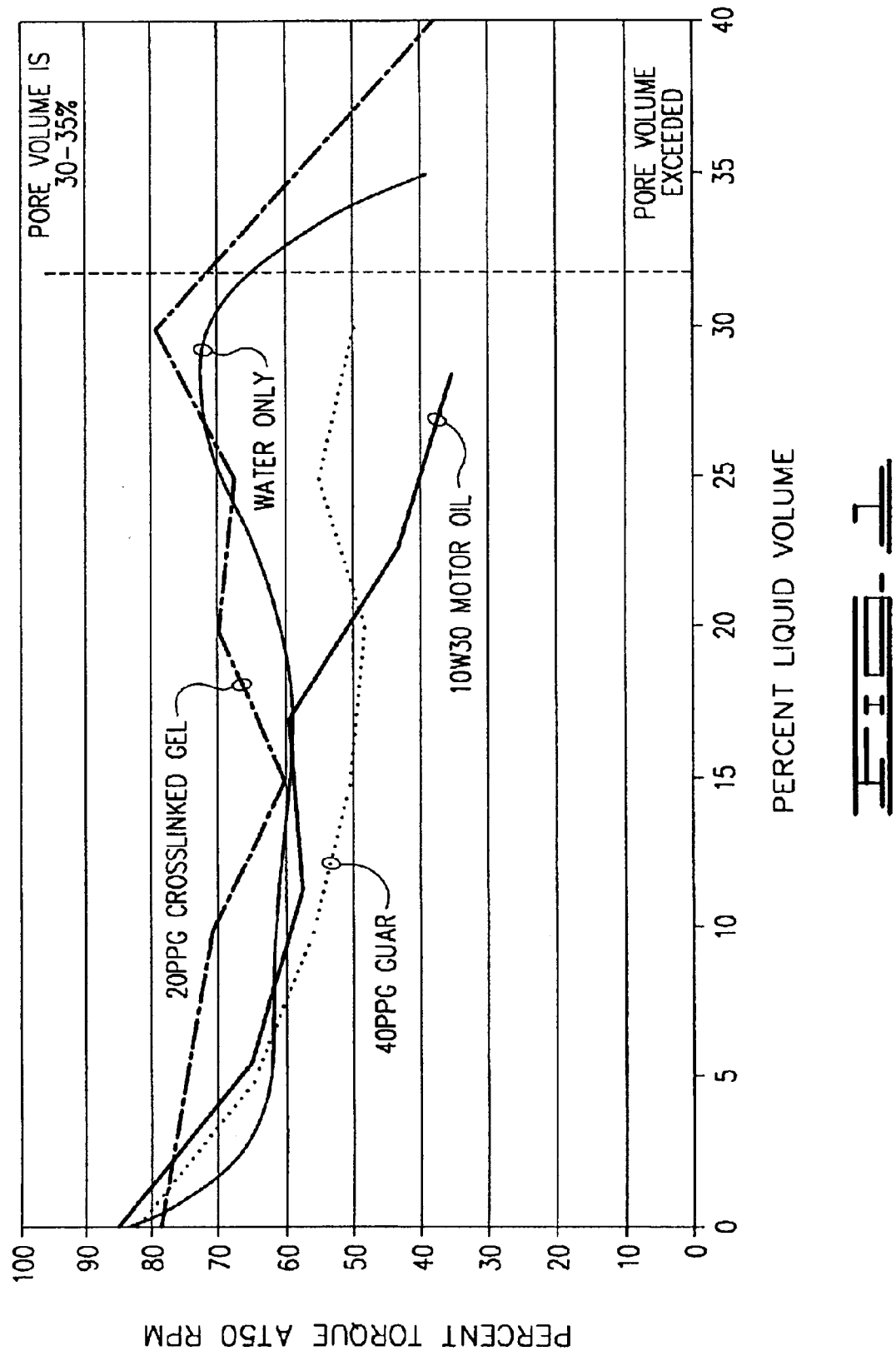
FIG. 1 is a graph showing the effect of adding water and various other liquids to the pore spaces of compacted glass beads.

The present invention provides improved methods and compositions for placing particulate materials in subterranean zones penetrated by well bores such as in forming gravel packs in subterranean zones, fracturing subterranean zones, and other similar procedures. The methods basically comprise the steps of preparing or providing a pumpable compacted particulate material fluid comprising compacted particulate material and a foam within the pore spaces of the compacted particulate material. The term "pore spaces" is used herein to mean the voids or interstices between the particulate material particles. The foam comprises a pressurized gas and a liquid solution of one or more foam forming surfactants. The compacted particulate material fluid prepared or provided is pumped into the subterranean zone.

Examples of the compacted particulate material which can be utilized for forming a pumpable compacted particulate material fluid of this invention include, but are not limited to, glass beads, ceramic beads, sintered bauxite, graded sand, resin coated sand, graded nut or seed shells, resin coated nut or seed shells, resin or plastic beads, metal beads and the like. The particulate material used can have a US Sieve Series mesh size in the range of from about 8 to about 100, with a mesh size of from about 20 to about 40 being preferred. Of the various compacted particulate materials that can be utilized, glass beads are preferred.

While a variety of gases can be utilized as the pressurized gas in the foam, nitrogen, carbon dioxide, compressed air, or mixtures thereof are generally preferred with nitrogen being the most preferred. The pressure of the pressurized gas depends on the pressure of the subterranean zone in which the compacted particulate material fluid is to be placed. Generally, the pressure of the gas is in the range of from about 200 psig to about 20,000 psig.

The liquid utilized for forming the liquid solution of one or more foam forming surfactants can be oils, alcohols, fresh water or salt water. The term "salt water" is used herein to mean unsaturated salt solutions including brines and seawater.

Examples of foam forming surfactants that can be utilized in the present invention include, but are not limited to, cationic surfactants such as quaternary compounds or protonated amines with hydrophobic groups having a chain length of from about 6 to 22 carbon atoms. Such surfactants include, but are not limited to, trimethylcocoammonium chloride, trimethyltallowammonium chloride, dimethyldicocoammonium chloride, bis(2-hydroxyethyl)tallowamine, bis (2-hydroxyethyl)erucylamine, bis(2-hydroxyethyl) cocoamine, cetylpyridinium chloride, and mixtures thereof. A preferred cationic surfactant is trimethyltallowammonium chloride.

Other suitable foam forming surfactants that can be utilized include, but are not limited to, anionic surfactants having a chain length of from about 6 to about 22 carbon atoms such as alpha olefin sulfonates, alkylether sulfates, alkyl phosphonates, alkane sulfonates, fatty acid salts, arylsulfonic acid salts, and mixtures thereof. A preferred such surfactant is an alpha olefin sulfonate having a chain length of 14 to 16 carbon atoms.

Yet other suitable foam forming surfactants that can be utilized include, but are not limited to, non-ionic surfactants such as linear or branched chain alcohol ethoxylates or alkylphenol ethoxylates with 2 to 30 ethoxylate units, having a chain length of from about 6 to about 22 carbon atoms.

Still other suitable foam forming surfactants that can be utilized include, but are not limited to, amphoteric surfactants having a chain length of from about 6 to about 22 carbon atoms such as betaines, sulfobetaines, amine oxides or aminocarboxylates.

The foam forming surfactant utilized is generally present in the liquid solution in an amount in the range of from about 0.1% to about 10% by weight of the solution, more preferably from about 0.5% to about 2% and most preferably 1%.

The liquid solution of a foam forming surfactant is present within the pore spaces of the compacted particulate material in an amount in the range of from about 5% to about 99% by volume of the total of the pore spaces, preferably in the range of from about 10 to about 35%. As will be understood by those skilled in the art, the total volume of the pore spaces in the compacted particulate material can be readily calculated based on the particle size or sizes of the particulate material and the total amount of particulate material utilized.

As will also be understood by those skilled in the art, dry particulate material is not pumpable. Also, a compacted particulate material that includes a small amount of a liquid is not pumpable due to solid-solid contact. In order to reduce the friction between the compacted particulate material particles, a lubricating substance is required. In accordance with the present invention, the compacted particulate material is fluidized, i.e., made flowable, by a liquid containing bubbles within the pore spaces of the compacted particulate material, i.e., a foam.

In the preparation of the compacted particulate material fluid of this invention, the pore spaces between the compacted particulate material are filled with pressurized gas. The pressure of the gas on the surface is such that when the compacted material reaches the subterranean zone in which the compacted particulate material fluid is to be placed, the pressure of the gas is substantially equal to the pressure in the subterranean zone. Thereafter, a liquid solution of a foam forming surfactant is injected into the pore spaces in an amount which produces a lubricating foam in the pore spaces. Once the foam forming surfactant has been injected, the compacted particulate material fluid can be pumped into the subterranean zone.

As mentioned above, the amount of the liquid solution injected in the gas filled pore spaces of the compacted particulate material is an amount less than the total volume of the pore spaces, but enough to reduce friction. The particular amount used can be determined based on the depth and pressure of the subterranean zone in which the compacted particulate material fluid is to be placed, the particulate material used and other factors. The amount of the surfactant in the liquid solution is generally in the range of from about 0.1% to about 10% by volume of the solution, most preferably 1%.

As also mentioned above, because the foam is within the pore spaces of the compacted particulate material fluid and there is no leak-off into the subterranean zone in which the compacted particulate material is placed, damage to the permeability of the subterranean zone is eliminated. Also, less pumping horsepower is required to pump the compacted particulate material fluid with shorter pumping times. Since there is no carrier fluid involved, the various chemical additives heretofore utilized in the carrier fluid are eliminated thereby eliminating the cost of the chemical additives and permeability damage to the subterranean zone. The liquid requirements are obviously significantly reduced and costs of the chemical additives and the disposal of a carrier fluid which flows back are eliminated. Finally, the compacted particulate material deposited in the subterranean zone will be clean and virtually free of permeability damage which allows the subterranean zone to produce hydrocarbons at its highest capacity.

A method of the present invention for fracturing a subterranean zone penetrated by a well bore and placing particulate material therein comprises the following steps. A pumpable compacted particulate material fracturing fluid comprising a compacted particulate material and a foam within the pore spaces of the compacted particulate material is prepared or provided. The foam comprises a pressurized gas and a liquid solution of one or more foam forming surfactants. The pumpable compacted particulate material fracturing fluid is pumped into the subterranean zone at a rate and pressure sufficient to fracture the zone. Thereafter, the pumping is terminated and the pressure is reduced so that the fractures close on the compacted particulate material fracturing fluid therein.

A particularly suitable method of this invention for fracturing a subterranean zone penetrated by a well bore and placing particulate material therein comprises the following steps. A pumpable compacted glass bead fluid comprising compacted glass beads and a foam within the pore spaces of the compacted glass beads is prepared or provided. The foam comprises pressurized nitrogen gas and a liquid solution of a foam forming surfactant. The liquid solution of the foam forming surfactant is present within the pore spaces of the compacted glass beads in an amount in the range of from about 5% to about 99% by volume of the pore spaces and the foam forming surfactant is present in the liquid solution in an amount in the range of from about 0.1% to about 10% by weight of the solution. The compacted glass bead fracturing fluid prepared or provided is pumped into the subterranean zone at a rate and pressure sufficient to fracture the zone. Thereafter, the pumping is terminated and the pressure is reduced so that the fractures close on the compacted glass bead fracturing fluid therein.

A pumpable particulate material fluid composition of this invention comprises the following components. Compacted particulate material having a foam within the pore spaces of the compacted particulate material. The foam comprises a pressurized gas and a liquid solution of a foam forming surfactant.

A particularly suitable pumpable particulate material fluid composition of this invention comprises the following components. Compacted glass beads having a foam within the pore spaces of the compacted glass beads. The foam comprises pressurized nitrogen gas and a liquid solution of a foam forming surfactant. The liquid solution of the foam forming surfactant within the pore spaces of the compacted glass beads is present therein in an amount in the range of from about 5% to about 99% by volume of the pore spaces and the foam forming surfactant is present in the solution in an amount in the range of from about 0.1% to about 10% by weight of the solution.

A preferred method of placing particulate material in a subterranean zone penetrated by a well bore comprises the steps of: (a) preparing or providing a pumpable compacted particulate material fluid comprising compacted particulate material and a foam within the pore spaces of the compacted particulate material, the foam comprising a pressurized gas and a liquid solution of a foam forming surfactant; and (b) pumping the compacted particulate material fluid into the subterranean zone.

Another preferred method of placing particulate material in a subterranean zone penetrated by a well bore comprises the steps of: (a) preparing or providing a pumpable compacted glass bead fluid comprising compacted glass beads having a mesh size in the range of from about 20 mesh to about 40 mesh and a foam within the pore spaces of the compacted glass beads comprising pressurized nitrogen gas and a liquid solution of a foam forming surfactant, the liquid solution of the foam forming surfactant being present within the pore spaces of the compacted glass beads in an amount in the range of from about 5% to about 99% by volume of the pore spaces; and (b) pumping the compacted glass bead fluid into the subterranean zone.

A preferred method of fracturing a subterranean zone penetrated by a well bore and placing particulate material therein comprising the steps of: (a) preparing or providing a pumpable compacted particulate material fracturing fluid comprising a compacted particulate material and a foam within the pore spaces of the compacted particulate material, the foam comprising a pressurized gas and a liquid solution of a foam forming surfactant; (b) pumping the compacted particulate material fracturing fluid into the subterranean zone at a rate and pressure sufficient to fracture the zone; and (c) terminating the pumping and reducing the pressure so that the fractures close on the compacted particulate material fracturing fluid therein.

Another preferred method of fracturing a subterranean zone penetrated by a well bore and placing particulate material therein comprises the steps of: (a) preparing or providing a pumpable compacted glass bead fluid comprising compacted glass beads having a mesh size in the range of about 20 mesh to about 40 mesh and a foam within the pore spaces of the compacted glass beads comprising pressurized nitrogen gas and a liquid solution of a foam forming surfactant, the liquid solution of the foam forming surfactant being present within the pore spaces of the compacted glass beads in an amount in the range of from about 5% to about 99% by volume of the pore spaces; (b) pumping the compacted glass bead fracturing fluid into the subterranean zone at a rate and pressure sufficient to fracture the zone; and (c) terminating the pumping and reducing the pressure so that the fractures close on the compacted glass bead fracturing fluid.

A preferred pumpable particulate material fluid composition of this invention comprises: compacted particulate material; and a foam within the pore spaces of the compacted particulate material, the foam comprising a pressurized gas and a liquid solution of a foam forming surfactant.

A preferred pumpable glass bead fluid composition comprising: compacted glass beads having a mesh size in the range of about 20 mesh to about 40 mesh; and a foam within the pore spaces of the compacted glass beads comprising pressurized nitrogen gas and a liquid solution of a foam forming surfactant, the liquid solution of the foam forming surfactant being present within the pore spaces of the compacted glass beads in an amount in the range of from about 5% to about 99% by volume of the pore spaces.

In order to further illustrate the methods and compositions of this invention, the following examples are given.

EXAMPLE 1

Tests were conducted to determine if compacted particles could be made flowable by placing a fluid in the pore spaces in an amount less than the total pore space volume of the particles.

Using a Brookfield HDPVII+ Viscometer, the relative torques of compacted 20/40 mesh glass beads having various fluids in the pore spaces of the beads were determined. The following procedure was used. The zero point on the viscometer was calibrated followed by placing a six-bladed spindle on the viscometer. 275 grams (180 mL) of the 20/40 mesh glass beads were weighed into a 250 mL beaker and the contents of the beaker were placed in the viscometer. The viscometer rotation speed was set to 50 rpm and measurements were taken after 20 seconds. The low and high readings observed between 20 and 30 seconds were recorded and the stable static torque reading was also recorded. The sample was removed and the spindle was cleaned.

A 5% portion of the liquid tested was added to 275 grams (180 mL) of 20/40 mesh glass beads and mixed. The resulting mixture was added to the viscometer and the torque of the glass beads was measured at 50 rpm and 0 rpm on the viscometer. Additional 5% portions of the liquid tested were added to the mixture and the torques were measured until the total pore space volume was exceeded.

The liquids tested were water, water viscosified with a guar derivative at the equivalent of 40 pounds per 1000 gallons, water viscosified with the guar derivative at the equivalent of 20 pounds per 1000 gallons and cross-linked with a borate cross-linker and Quaker State 10-W-30 motor oil. The results of the tests are shown in FIG. 1.

From FIG. 1 it can be seen that when less water than the total pore space volume of the compacted glass beads was added to the beads, the friction was reduced by about 25% of the friction of the dry particles alone and the beads with less than the total pore space volume of water were not flowable. (Flowable is defined in the method of Example 3.) When the amount of water exceeded the total pore space volume, the beads were no longer compacted and they became flowable.

When water viscosified with a guar derivative was used, additional friction reduction took place than when water only was used, but the beads did not become flowable. When the viscosified and cross-linked water was used, the friction was not substantially reduced and the beads did not become flowable until more than the total pore space volume was exceeded.

The oil produced much the same friction as water and the compacted beads did not become flowable whereby they could be pumped.

EXAMPLE 2

Figure 2:
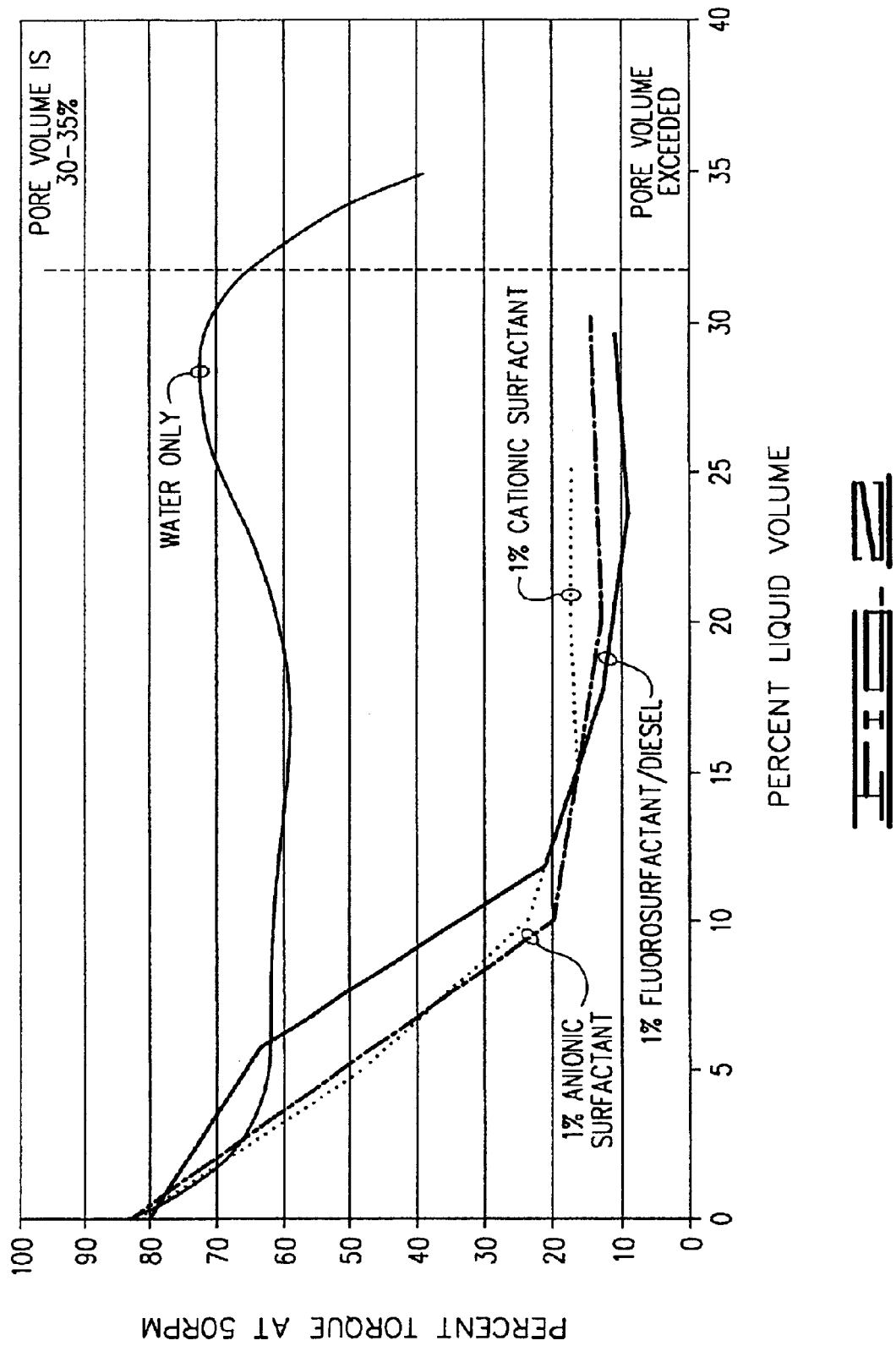
FIG. 2 is a graph showing the effect of adding water and various water solutions of surfactants to the pore spaces of compacted glass beads.

Water containing surfactants were tested as described in Example 1 above. A solution of water having 1% by volume of an alpha olefin sulfonate anionic surfactant therein was stirred into the compacted glass beads. Surprisingly, the friction was reduced to less than one-third of the dry value as shown in FIG. 2 and the mixture became flowable. The pore spaces contained air and the addition of a small amount of the 1% surfactant solution, i.e., an amount of about 5% by volume of the compacted glass beads did not make the compacted glass beads flowable. However, when the 1% anionic surfactant solution was added to the compacted glass beads in an amount of about 10% by volume of the compacted glass beads (about one-third of the total pore space volume), enough liquid was present to trap the air in the pore spaces as bubbles and fluidize the glass beads as shown by the low torque value in FIG. 2. As also shown in FIG. 2, a solution of water having 1% by volume of a trimethyltallowammonium chloride cationic surfactant and a 1% by volume fluorosurfactant mixed with diesel oil produced similar results to the water-surfactant solutions. Fluorosurfactants mixed with alcohol can also be used.

Other compacted particulate materials having higher friction properties, i.e., Ottawa sand and intermediate strength ceramic particles, were also tested and it was found that those materials could also be made flowable as described above.

EXAMPLE 3

Figure 3:
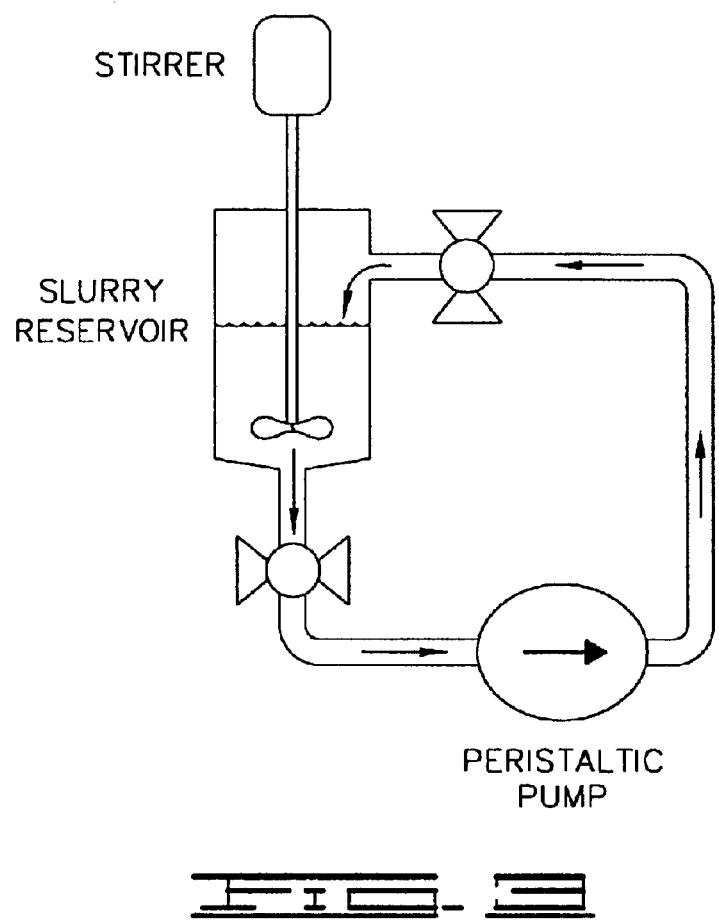
FIG. 3 is a schematic illustration of a benchtop flow loop used to determine if the flowable compacted particulate materials of this invention could be pumped.

To determine if the compacted particulate materials described above were flowable and could be pumped, a benchtop flow loop as shown in FIG. 3 was constructed. One liter of 20/40 mesh compacted glass beads were mixed with 100 mL of a water solution of a 1% alpha-olefin sulfonate surfactant. The compacted glass beads were poured into the slurry reservoir and stirred. The peristaltic pump was turned on, and the compacted glass beads were flowable and easily recirculated at rates from 0.2 to 0.9 gallon per minute. After stopping the flow and allowing the mixture to stand for 10 to 15 minutes, the pump was restarted without difficulty which indicated the compacted glass beads of this invention can be pumped after being at rest.

Thus, the present invention is well adapted to carry out the objects and attain the ends and advantages mentioned as well as those which are inherent therein. While numerous changes can be made by those skilled in the art, such changes are encompassed within the spirit of this invention as defined by the appended claims.

What is claimed is:

1. A method of placing particulate material in a subterranean zone penetrated by a well bore comprising:
   providing a compacted particulate material fluid that comprises
      a compacted particulate material, and
      a foam within the pore spaces of the compacted particulate material, the foam comprising a pressurized gas and a liquid solution of a foam forming surfactant; and
   pumping the compacted particulate material fluid into the subterranean zone.

2. The method of claim 1 wherein the compacted particulate material comprises at least one of the following: glass beads; ceramic particles; sintered bauxite; graded sand; resin coated sand; graded nut shells; graded seed shells; resin coated nut shells; resin coated seed shells; resin beads; plastic beads; or metal beads.

3. The method of claim 1 wherein the compacted particulate material has a mesh size in the range of from about 8 mesh to about 100 mesh.

4. The method of claim 3 wherein the compacted particulate material comprises glass beads.

5. The method of claim 1 wherein the pressurized gas comprises at least one of the following: nitrogen; carbon dioxide; or compressed air.

6. The method of claim 1 wherein the pressurized gas has a pressure in the range of from about 200 psig to about 20,000 psig.

7. The method of claim 1 wherein the liquid solution of a foam forming surfactant comprises at least one of the following: an oil; an alcohol; fresh water; or salt water.

8. The method of claim 1 wherein the foam forming surfactant comprises at least one of the following: a cationic surfactant having a chain length of from about 6 to 22 carbon atoms; an anionic surfactant having a chain length of from about 6 to about 22 carbon atoms; a non-ionic surfactant having a chain length of from about 6 to about 22 carbon atoms; or an amphoteric surfactant having a chain length of from about 6 to about 22 carbon atoms.

9. The method of claim 8 wherein the cationic surfactant comprises at least one of the following: trimethylcocoammonium chloride; trimethyltallowammonium chloride; dimethyldicocoammonium chloride; bis(2-hydroxyethyl)tallowamine; bis(2-hydroxyethyl)erucylamine; bis(2-hydroxyethyl)cocoamine; or cetylpyridinium chloride.

10. The method of claim 8 wherein the anionic surfactant comprises at least one of the following: an alpha-olefin sulfonate; an alkylether sulfate; an alkyl phosphonate; an alkane sulfonate; a fatty acid salt; or an arylsulfonic acid salt.

11. The method of claim 8 wherein the non-ionic surfactant comprises at least one of the following: a linear or branched chain alcohol; or an alkylphenol ethoxylate having 2 to 30 ethoxylate units.

12. The method of claim 8 wherein the amphoteric surfactant comprises at least one of the following: a betaine; a sulfobetaine; an amine oxide; or an aminocarboxylate.

13. The method of claim 1 wherein the liquid solution comprises water and the foam forming surfactant comprises an alpha olefin sulfonate having a chain length of 14 to 16 carbon atoms.

14. The method of claim 1 wherein the foam forming surfactant is present in an amount in the range of from about 0.1% to about 10% by weight of the liquid solution of the foam forming surfactant.

15. The method of claim 1 wherein the liquid solution of the foam forming surfactant is present in an amount in the range of from about 5% to about 99% by volume of the pore spaces in the compacted particulate material.

16. A method of placing particulate material in a subterranean zone penetrated by a well bore comprising:

providing a compacted glass bead fluid comprising compacted glass beads having a mesh size in the range of about 20 mesh to about 40 mesh and a foam within the pore spaces of said compacted glass beads comprising pressurized nitrogen gas and a liquid solution of a foam forming surfactant, the liquid solution of the foam forming surfactant being present in an amount in the range of from about 5% to about 99% by volume of the pore spaces in the compacted particulate material; and pumping the compacted glass bead fluid into the subterranean zone.

17. The method of claim 16 wherein the foam forming surfactant comprises an alpha olefin sulfonate having a chain length of 14 to 16 carbon atoms, and the foam forming surfactant is present in an amount in the range of from about 0.1% to about 10% by weight of the liquid solution of the foam forming surfactant.

18. A method of fracturing a subterranean zone penetrated by a well bore and placing particulate material therein comprising:

providing a compacted particulate material fracturing fluid comprising compacted particulate material and a foam within the pore spaces of said compacted particulate material, said foam comprising a pressurized gas and a liquid solution of a foam forming surfactant;

pumping the compacted particulate material fracturing fluid into the subterranean zone at a rate and pressure sufficient to create or enhance one or more fractures in at least a portion of the zone;

terminating the pumping of the compacted particulate material fracturing fluid; and reducing the pressure so that the fractures close on the compacted particulate material fracturing fluid.

19. The method of claim 18 wherein the compacted particulate material comprises at least one of the following: glass beads; ceramic particles; sintered bauxite; graded sand; resin coated sand; graded nut shells; graded seed shells; resin coated nut shells; resin coated seed shells; resin beads; plastic beads; or metal beads.

20. The method of claim 18 wherein the compacted particulate material has a mesh size in the range of from about 8 mesh to about 100 mesh.

21. The method of claim 18 wherein the compacted particulate material comprises glass beads.

22. The method of claim 18 wherein the pressurized gas in the foam comprises at least one of the following: nitrogen; carbon dioxide; or compressed air.

23. The method of claim 18 wherein the pressurized gas has a pressure in the range of from about 200 psig to about 20,000 psig.

24. The method of claim 18 wherein the liquid solution of a foam forming surfactant comprises at least one of the following: an oil; an alcohol; fresh water; or salt water.

25. The method of claim 18 wherein the foam forming surfactant comprises at least one of the following: a cationic surfactant having a chain length of from about 6 to 22 carbon atoms; an anionic surfactant having a chain length of from about 6 to about 22 carbon atoms; a non-ionic surfactant having a chain length of from about 6 to about 22 carbon atoms; or an amphoteric surfactant having a chain length of from about 6 to about 22 carbon atoms.

26. The method of claim 25 wherein the cationic surfactant comprises at least one of the following: trimethylcocoammonium chloride; trimethyltallowammonium chloride; dimethyldicocoammonium chloride; bis(2-hydroxyethyl) tallowamine; bis(2-hydroxyethyl)erucylamine; bis(2-hydroxyethyl)cocoamine; or cetylpyridinium chloride.

27. The method of claim 25 wherein the anionic surfactant comprises at least one of the following: an alpha-olefin sulfonate; an alkylether sulfate; an alkyl phosphonate; an alkane sulfonate; a fatty acid salt; or an arylsulfonic acid salt.

28. The method of claim 25 wherein the non-ionic surfactant comprises at least one of the following: a linear or branched chain alcohol; or an alkylphenol ethoxylate having 2 to 30 ethoxylate units.

29. The method of claim 25 wherein amphoteric surfactant comprises at least one of the following: a betaine; a sulfobetaine; an amine oxide; or an aminocarboxylate.

30. The method of claim 18 wherein the liquid solution comprises water and the foam forming surfactant comprises an alpha olefin sulfonate having a chain length of 14 to 16 carbon atoms.

31. The method of claim 18 wherein the foam forming surfactant is present in an amount in the range of from about 0.1% to about 10% by weight of the liquid solution of the foam forming surfactant.

32. The method of claim 18 wherein the liquid solution of the foam forming surfactant is present in an amount in the range of from about 5% to about 99% by volume of the pore spaces in the compacted particulate material.

33. A method of fracturing a subterranean zone penetrated by a well bore and placing particulate material therein comprising:

providing a compacted glass bead fluid comprising compacted glass beads having a mesh size in the range of about 20 mesh to about 40 mesh and a foam within the pore spaces of said compacted glass beads comprising pressurized nitrogen gas and a liquid solution of a foam forming surfactant, the liquid solution of the foam forming surfactant being present within said pore spaces of said compacted glass beads in an amount in the range of from about 5% to about 99% by volume of the pore spaces;

pumping the compacted glass bead fracturing fluid into the subterranean zone at a rate and pressure sufficient to create or enhance one or more fractures in at least a portion of the zone; and terminating the pumping of the compacted glass bead fracturing fluid; and reducing the pressure so that the fractures close on the compacted glass bead fracturing fluid.

34. The method of claim 33 wherein the foam forming surfactant comprises an alpha olefin sulfonate having a chain length of 14 to 16 carbon atoms, and the foam forming surfactant is present in an amount in the range of from about 0.1% to about 10% by weight of the liquid solution of the foam forming surfactant.

* * * * *